United States Patent
Isele et al.

(10) Patent No.: US 7,493,700 B2
(45) Date of Patent: Feb. 24, 2009

(54) POWER SAW COMPRISING A DISPLAY DEVICE

(76) Inventors: Siegfried Isele, Aichen 15, 79761 Waldshut-Tiengen (DE); Ralf Basler, Kirchweg 5, 79761 Waldshut-Gaiβ (DE)

(*) Notice: Subject to any disclaimer, the term of this patent is extended or adjusted under 35 U.S.C. 154(b) by 205 days.

(21) Appl. No.: 10/545,779

(22) PCT Filed: Feb. 17, 2004

(86) PCT No.: PCT/EP2004/001495

§ 371 (c)(1),
(2), (4) Date: Jun. 29, 2006

(87) PCT Pub. No.: WO2004/071726

PCT Pub. Date: Aug. 26, 2004

(65) Prior Publication Data

US 2006/0277775 A1 Dec. 14, 2006

(30) Foreign Application Priority Data

Feb. 17, 2003 (DE) .............. 103 06 729
Jul. 25, 2003 (DE) .............. 103 34 289

(51) Int. Cl.
G01C 15/00 (2006.01)
B26D 7/28 (2006.01)
B27B 17/00 (2006.01)

(52) U.S. Cl. .............. 33/286; 33/628; 33/630; 33/DIG. 21; 30/123; 83/522.15; 362/120

(58) Field of Classification Search .............. 33/286, 33/201, 202, 626, 628, 630, 632–634, 640, 33/641, 678, 282, 285, DIG. 21; 83/522.15–522.25; 30/123; 362/33, 89, 109, 119, 120
See application file for complete search history.

(56) References Cited

U.S. PATENT DOCUMENTS

| 4,319,404 A | * | 3/1982 | Brock ............... 33/263 |
| 4,388,762 A | | 6/1983 | Debell, Jr. et al. |
| 6,295,738 B1 | | 10/2001 | Risch |

(Continued)

FOREIGN PATENT DOCUMENTS

DE    9010716 U1    9/1990

(Continued)

OTHER PUBLICATIONS

German Search Report.

(Continued)

*Primary Examiner*—G. Bradley Bennett
*Assistant Examiner*—Amy Cohen Johnson
(74) *Attorney, Agent, or Firm*—Dority & Manning, P.A.

(57) ABSTRACT

A cutting tool is provided having a marking feature to facilitate the cutting of materials at desired lengths. The tool includes a laser that provides a beam for marking the material at a determined length based on the angle that the beam forms with the cutting axis of the tool. The tool may be configured so that the beam can be emitted on either side of the tool. The tool may be reconfigured so that the angle of the beam relative to the cutting axis of the tool is selectively adjustable.

22 Claims, 3 Drawing Sheets

U.S. PATENT DOCUMENTS

| | | | | |
|---|---|---|---|---|
| 6,301,997 | B1 * | 10/2001 | Welte | 81/54 |
| 6,898,860 | B2 * | 5/2005 | Wu | 33/286 |
| 6,939,022 | B2 * | 9/2005 | Brooks | 362/120 |
| 7,185,998 | B2 * | 3/2007 | Oomori et al. | 362/119 |
| 2002/0069542 | A1 | 6/2002 | Musacchia, Jr. | |

FOREIGN PATENT DOCUMENTS

| | | | |
|---|---|---|---|
| DE | 3922849 | A1 | 1/1991 |
| DE | 4108710 | A1 | 3/1992 |
| DE | 19708467 | | 8/1998 |
| DE | 19904679 | | 8/2000 |
| DE | 20120529 | U1 | 3/2002 |
| DE | 20115759 | U1 | 4/2002 |

OTHER PUBLICATIONS

International Search Report Issued by the EPO.

* cited by examiner

POWER SAW COMPRISING A DISPLAY DEVICE

TECHNICAL FIELD OF THE INVENTION

The present invention relates to a cutting tool display device that provides a marking feature to facilitate the cutting of materials at desired lengths. The tool includes a laser that provides a beam for marking the material at a determined length based on the angle that the beam forms with the cutting axis of the tool.

BACKGROUND OF THE INVENTION

DE 199 04 679 A1 teaches a laser-adjusted measuring aid for workers in woods and forests. The measuring aid disclosed in it is intended to replace a cross-cut measuring rod, a measuring tape, or a slide caliper. To this end two laser pointers are arranged at an angle to one another in a holder. The laser beams form a type of distance compasses with which a defined length can be measured at a predetermined interval of the holder to the piece of wood to be measured. The holder is fastened to this end, e.g., on a belt, and adjusted or set to the particular height of the belt from the ground below. Two lasers are required in this measuring aid. An adjustment must be made on the holder for a defined distance measuring as well as for the height of the arrangement of the holder and the angle between the two lasers. This is especially difficult when working on a slope.

DE 197 08 467 A1 teaches a device for indirect and multi-dimensional measuring and a position aid for indicating theoretical positions. The compass-like distance measuring device comprises a mechanical and an optical shank. The angle between the mechanical object shank and the sensor axis, which represents the optical shank, is adjustable. This hand measuring device has the disadvantage that although a certain distance can be displayed as when using a cross-cut measuring rod, the starting and end points of the distance must be marked, e.g., with a pencil, on the workpiece to be measured. The tool must be taken up by the worker in a subsequent work step and the workpiece must be worked.

In addition to other disadvantages, the described auxiliary means are not especially easy to use. If, for example, tree trunks are being crosscut, the pre-set measurement, e.g., 1 meter, must first be characterized with the auxiliary device and, if necessary, with a pencil or some other marking device. Then, the tool must be taken in the hand and the tree trunk crosscut to the required measurement. The measuring tool is restarted, then the marking performed and the tree trunk crosscut again, etc. This requires a significant amount of time and is problematic for the workers.

US 2002/0069542 A1 teaches a motor saw that comprises a laser for marking a certain length of the tree trunk to be cut off. The laser is arranged on one side of the motor saw. The crosscutting of the trunk can therefore only take place from one side. Moreover, it is arranged on a very exposed position of the saw and is therefore not suitable for resisting the rough conditions in forestry work.

Therefore, an object of the present invention is creating a display device that permits a rapid and comfortable working of a workpiece at regular intervals under difficult environmental conditions.

THE SUMMARY OF THE INVENTION

Objects and advantages of the invention will be set forth in part in the following description, or may be obvious from the description, or may be learned through practice of the invention.

In an exemplary embodiment of the invention, a display device is arranged on a motor saw comprising a saw blade as a tool, a handle in an extension of the tool, and a handle arranged substantially transversely to the tool for holding the motor saw. The display device includes a laser with an actuatable laser beam that is arranged on an end facing away from the tool and/or underneath the handle. The laser beam is aligned on the motor saw at an angle ($\alpha$) of more than 0° and less than 90°, preferably less than 45° to the tool axis and the laser beam and/or the laser is/are selectively directed to the one or the other side of the tool axis.

With a point or a line, the laser marks a certain distance between the tool and the striking area of the laser on the workpiece with a laser beam on the tool. A certain distance is determined by a determined angle of the laser or by the laser beam relative to the tool axis. As a result, for example, the crosscutting in a workpiece can be carried out very rapidly since the laser point or, if a line laser is used, the laser line has to be positioned only on the last work location or on a given location on the workpiece and the tool is consequently arranged at the predetermined interval. This makes it possible to divide, for example, tree trunks, into predetermined sections especially rapidly and in a simple manner. Furthermore, the laser line serves to precisely position the motor saw at a right angle and in the correct axis. If the saw is not properly aligned the line disappears from the tree trunk and therefore serves as a signal for a better aligning of the saw relative to the tree trunk.

In yet other exemplary embodiments of the present invention, if the laser beam and/or the laser is/are selectively directed to the one or the other side of the tool axis, the adjusted measurement can be very rapidly set left or right from the motor saw. This makes very flexible working possible.

If the laser is arranged in a fixed or add-on manner in a tool handle of a tool machine, the laser can always be transported with the tool machine and turned on when needed. Such a tool machine can become distinctly more valuable as regards its useful value by the display device of the invention. Even existing tool machines can be significantly improved in their usage by replacing the old tool handle with a new tool handle containing the display device. It is also possible to add the display device to the existing handle or some other suitable component of a tool machine as an add-on component.

The motor-saw blade must merely be localized substantially at a right angle to the tree trunk in order to substantially maintain the predetermined distance. It is especially uncritical as concerns the correct placing of the tool on the workpiece if the angle between the tool axis and the laser beam is between 0° and 45°. As a result thereof, a slight deviation of the right-angle positioning of the motor-saw blade vis-à-vis the tree trunk is largely uncritical since this has hardly any effect on the predetermined distance. Even other localizations are possible. For example, the tree trunk can be placed on the claw of the motor saw. The adjustment and the sawing must take place in any case in the same manner.

If the beam and/or the laser is/are selectively directed to the one or the other side of the tool axis by rotating about a point of rotation arranged in the tool axis, the changing of the measuring side can take place very rapidly.

In order to achieve a very simple installation of the display device on a motor saw or in a housing that is selectively added onto a motor saw, the laser beam is deflected with a mirror. The laser itself is permanently installed in this instance. The measuring length and the measuring side of the laser beam can be adjusted by rotating the mirror.

If the laser is actuated with a touch-control switch a stronger laser can be used that is readily visible since damage to the health of a person by irradiating him in an unintended manner is largely avoided. Furthermore, the battery consumption is less compared to a permanent on/off switch since it is only actuated when needed and only when the switch is actively pressed.

As regards its angle, the laser is advantageously adjustably arranged on a holder. This makes it possible to adjust different distances that are located between the tool and the location where the laser beam strikes the workpiece.

It is especially helpful if markings and/or click notches are provided on the holder that indicate a certain distance. This makes it possible to carry out the adjusting of the required angle as a function of the desired distance in an especially rapid manner. It is also possible to add a stop in order to be able to preset lengths.

Optionally, if the holder itself is rotatably mounted, in addition to the ability of the laser to rotate on the holder, and if the axis of rotation is preferably in the tool axis, then the display device can be adjusted, e.g., to different tool lengths. However, the scale arranged in the holder for certain distances can be retained.

It is especially advantageous and inventive if the holder is arranged on the tool machine in such a manner that it can be changed in order to selectively display the laser beam on one of the two sides of the tool machine while retaining the set angle. The changing over of the holder can take place either by means of the previously described, rotatable mounting of the holder or by stops that permit the holder to be used in a mirror-inverted manner relative to the tool axis. As a result of this especially advantageous feature of the invention it is possible to reverse the working direction. In this manner the display device can indicate the marking position as a point or a line on the workpiece in the one instance on the left and in the other instance on the right of the tool machine. The last step can service an orientation for the laser point or laser line as a function of the direction in which the tree trunk is to be cut apart.

If the direction of the laser beam and/or of the laser can be adjusted with a rotary knob, this makes an especially simple and compact construction possible.

The laser is advantageously arranged in a motor saw in such a manner that it is protected from shocks and/or vibrations. This prevents damage to the laser even when it is vigorously used, e.g., in forestry work.

In order to avoid disturbing influences of the tool machine on the laser, it is advantageous if the laser is arranged at the greatest possible distance from the drive of the tool machine. As a consequence, heat and electrical fields of the drive of the tool machine hardly affect the laser any more.

It is especially advantageous if the laser is arranged on the end of the motor saw facing away from the tip of the tool. This creates a relatively large distance of the laser from the worksite, which improves the measuring accuracy of the display device.

If the laser is a line laser, a very precise and clear display of the measuring beam can be obtained on the workpiece to be cut.

If the laser is arranged in a housing niche of the motor saw as an add-on part or as an integrated component, an especially good protection of the display device is given.

If the display device consists of an adapter and a laser carrier, it can be arranged in an especially advantageous manner even subsequently on a motor saw. The laser carrier receives the essential components of the display device in this instance whereas the adapter forms the connection to the motor saw. The same display device can be used for different motor saws by using different adapters.

If the adapter has a rotary device corresponding with the laser carrier, that adapter can be permanently installed on the motor saw and the laser carrier can be rotated about the adapter as base into the desired position and therewith into the desired distance of the striking point of the laser beam onto the material to be cut.

The current supply and/or the switch is/are advantageously arranged on the laser carrier. This constitutes a largely independent component that can be added onto any motor saw.

If the laser carrier surrounds the adapter, the latter can function as an axis of rotation of the laser carrier. This constitutes an especially simple, versatile, and economical embodiment of the invention. It can be mounted and dismounted by anyone.

If the laser carrier is designed to be divisible, it can be readily removed from the adapter and the motor saw in that the laser carrier is divided and drawn off from the adapter. In order to fasten the laser carrier on the adapter again, it is again placed around the adapter and fixed.

In an ergonomically especially advantageous embodiment of the invention, the switch is not arranged on the laser carrier but rather on the handle or holder. In this instance, the switch can be actuated as needed, e.g., by the thumb. If the laser is not needed, that is for example, after a marking was produced by the saw on the material to be cut, the laser can be turned off again or let go of if there is a touch-control switch. This saves current consumption and extends the service life of the laser.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Figure 1:
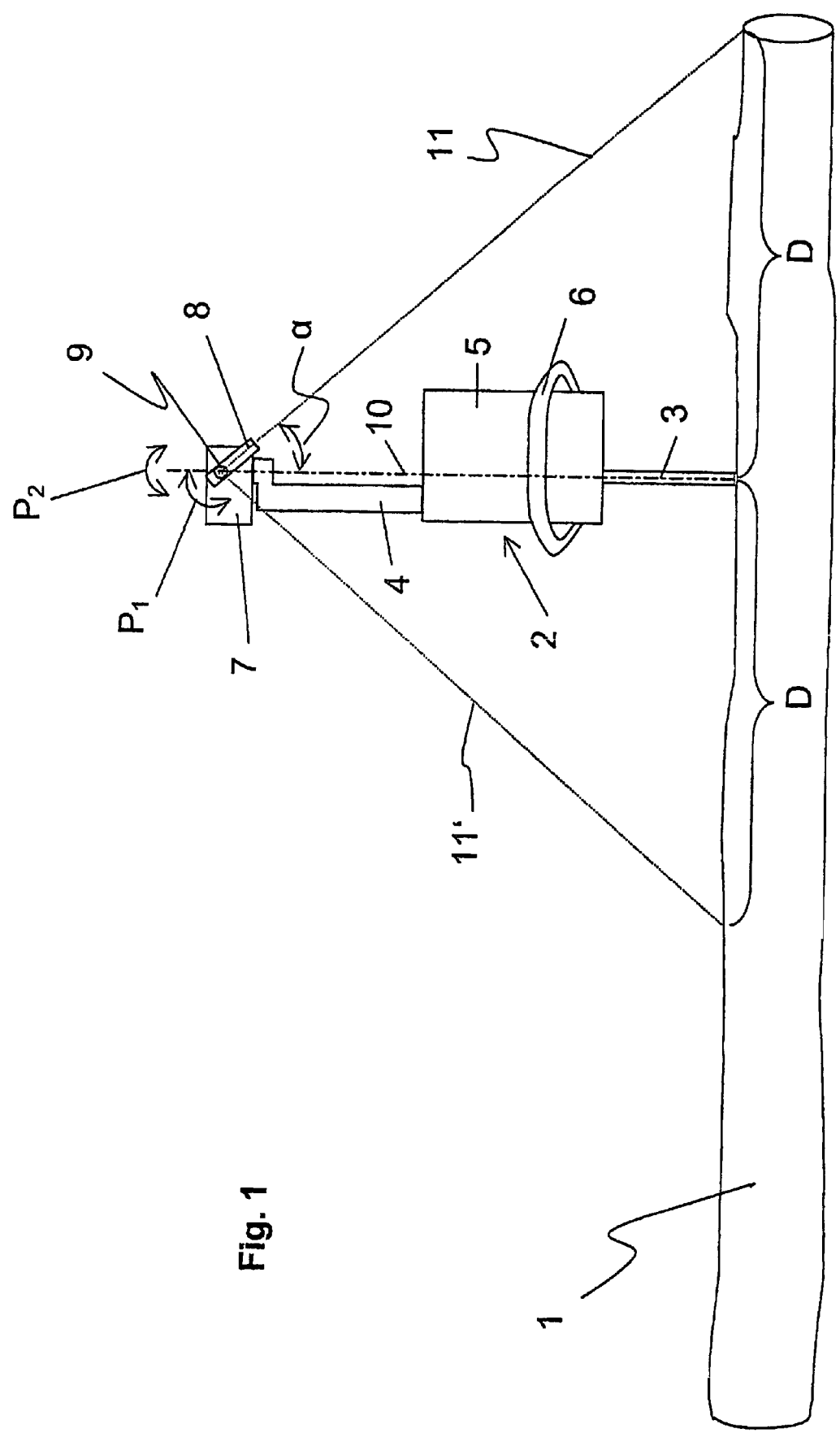
FIG. 1 shows an exemplary motor saw with a display device.

Reference will now be made in detail to embodiments of the present invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

FIG. 1 shows a sketched tree trunk 1 and a motor saw 2. Motor saw 2 consists of saw blade 3, handle 4, and motor 5 arranged between them. Bracket 6 is arranged on motor 5 or its housing in order to be able to hold motor saw 2 better.

Holder 7 is provided on handle 4 on the end of motor saw 2 facing away from saw blade 3.

A laser 8 is fastened on holder 7. Laser 8 is mounted so that it can rotate by means of swivel pin 9 in arrow direction $P_1$ in order to be able to assume a predetermined angle α with axis 10 running through saw blade 3. Angle α is finally fixed with a clamping device (not shown), e.g., a screw or a quick-action vice.

Laser beam 11 exiting from laser 8 strikes the end of tree trunk 1 in the exemplary embodiment shown. A predetermined distance D between the striking point of the laser beam and the tip of saw blade is fixed by angle α and the set distance from the tip of saw blade to swivel pin 9. The desired, predetermined distance D of saw blade 3 from the trunk end is therefore maintained by set angle α by aiming laser beam 11 at the trunk end. The operator of motor saw 2 merely has to pay attention to the striking position, namely, the striking point or striking line of laser beam 11 on tree trunk 1 in order to obtain the defined and desired distance D for the current saw cut starting from this position.

If a changed distance D is desired, angle α can be changed by rotating laser 8 about swivel pin 9. Tree trunk 1 shown here can be cut with the new measurement by a new fixing.

Whereas the embodiment shown here shows the cut to the left of the end of the tree trunk, it can also be desirable in some applications to crosscut the tree trunk from the left end of the tree trunk. In order to be able to retain set distance D it is therefore provided that holder 7 is pivotably mounted about axis 10. Angle α is retained by this shifting of holder 7 together with laser 8. As such, laser beam 11 is directed onto the other side of motor saw 2 and generates laser beam 11'. Distance D is also retained as result thereof since angle α was shifted by the shifting of holder 7 in arrow direction $P_2$.

Figure 2:
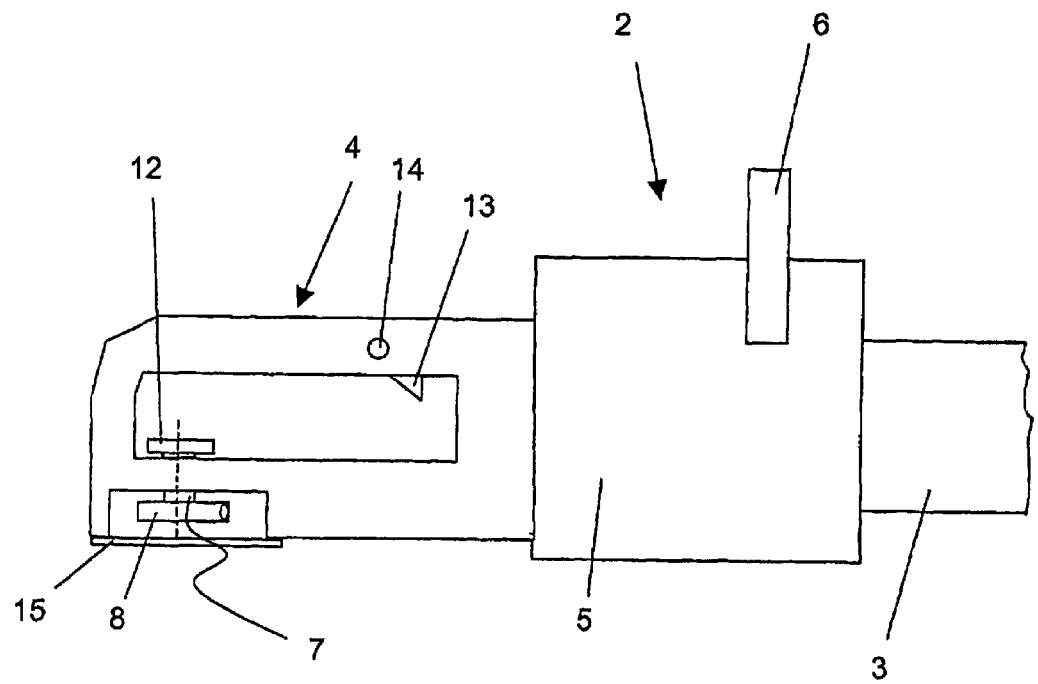
FIG. 2 shows an exemplary display device integrated in a handle.

FIG. 2 shows a section of a motor saw 2 in another exemplary embodiment of the invention in which the display device is built into handle 4. This can take place either in a standard manner for equipping motor saw 2 or it can be added onto motor saw 2 subsequently as a special equipping. In this instance the display device is arranged on the lower rear end of handle 4. In this exemplary embodiment it is protected in a niche of handle 4.

Laser 8 is fastened on holder 7. Holder 7 can rotate together with laser 8 by means of rotary knob 12 so that different distances or sides of the display can be set. If additional protection of laser 8 is desired, cover 15 can be arranged below laser 8.

Touch-control switch 14 for actuating the laser is arranged in the vicinity of start button 13 of motor saw 2. Laser 8 is actuated only when touch-control switch 14 is held pressed down. This reduces the current consumption of laser 8 and increases the operating safety.

A mirror can also be arranged at the location of laser 8 on holder 7 which mirror can be rotated by rotary knob 12. In this exemplary embodiment the laser is arranged in a fixed and stationary manner, e.g., in handle 4. The laser beam is deflected by the mirror as desired.

Figure 3:
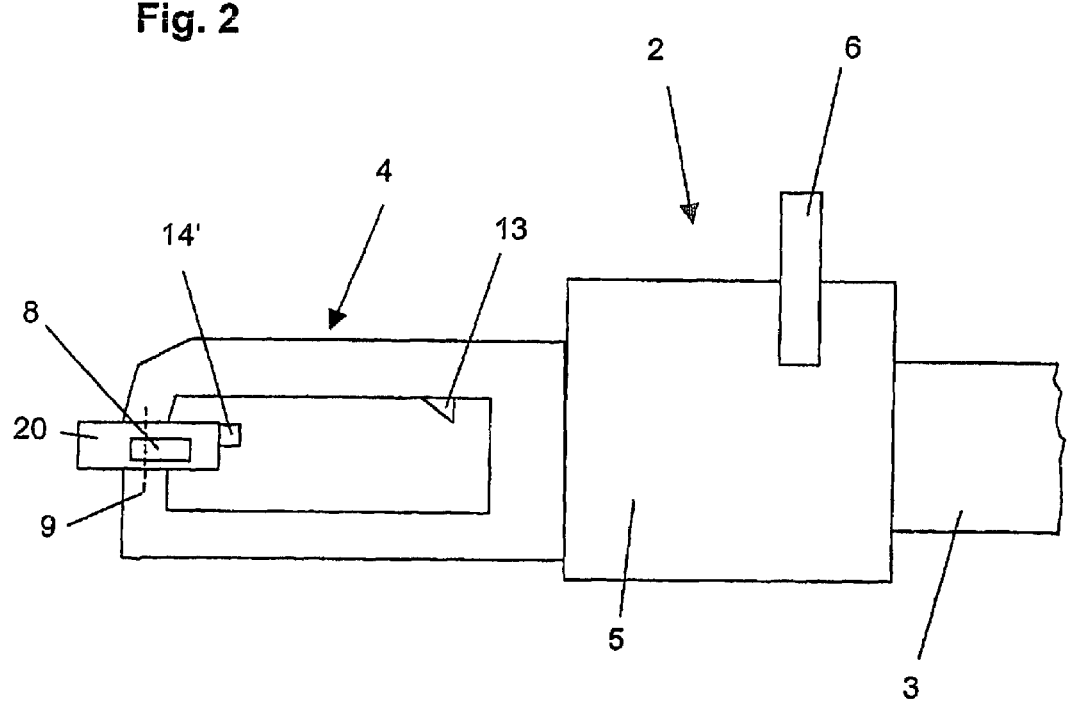
FIG. 3 shows another exemplary display device integrated in a handle.

FIG. 3 shows another exemplary embodiment in which the display device is added on the rear end of handle 4. The display device consists in this exemplary embodiment of laser carrier 20 to which laser 8 is fastened. In addition, switch 14' is arranged on laser carrier 20 with which switch laser 8 can be actuated as required. Switch 14' is preferably designed in such a manner that it supplies laser 8 with current only during its active actuation. Laser 8 is actuated by briefly tilting switch 14' in order to fix the length of the material to be cut.

Laser carrier 20 can rotate about swivel pin 9. Swivel pin 9 is provided in handle 4. Thus, laser holder 20 rotates around the rear end of handle 4 either when the length to be crosscut is to be adjusted or when the side of motor saw 2 to be marked is to be changed.

Figure 4:
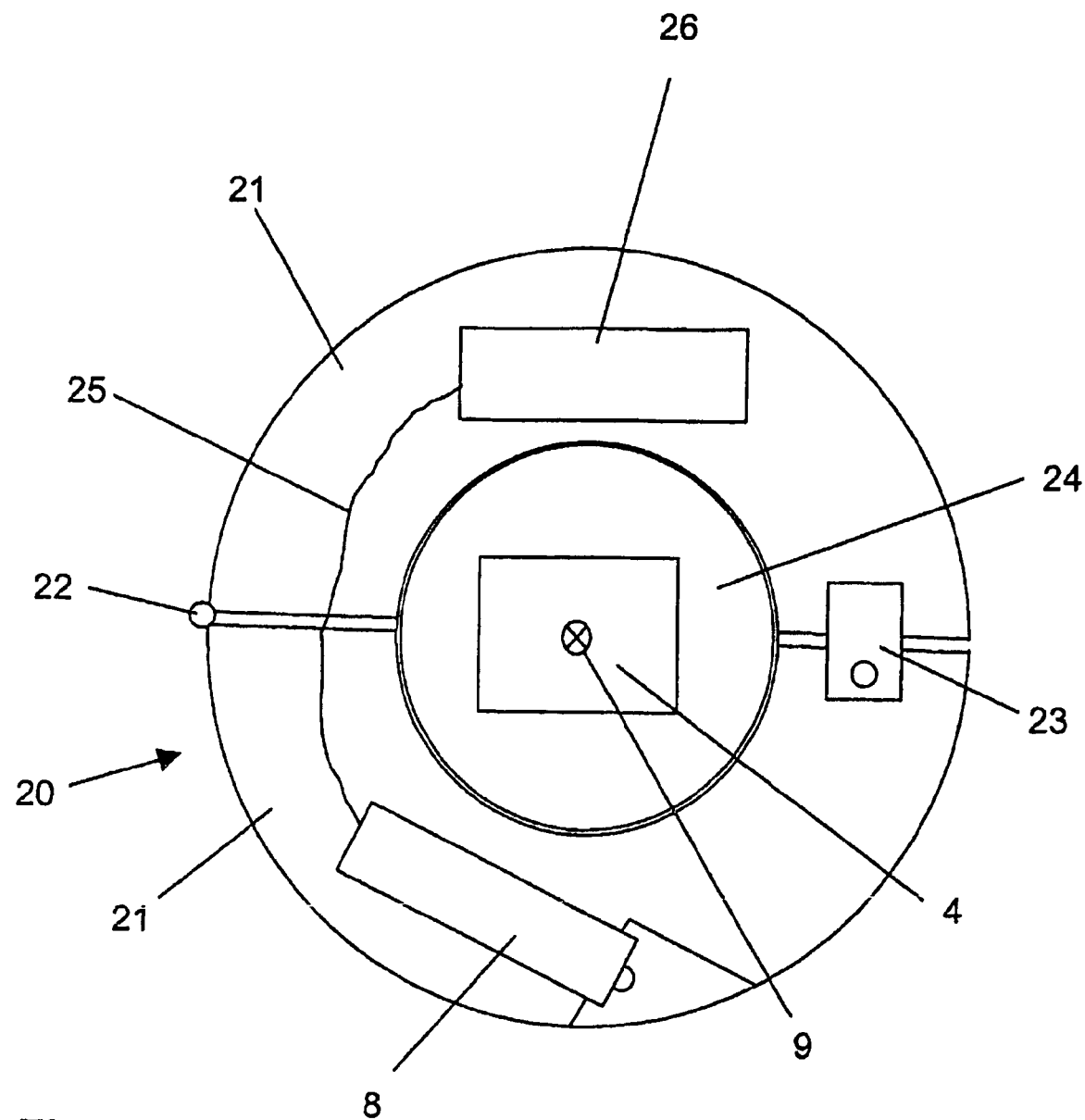
FIG. 4 shows an example display device with laser carrier and adapter.

Laser carrier 20 is shown in more detail in FIG. 4. Laser carrier 20 consists in the present exemplary embodiment of two halves 21 connected to one another by hinge 22. The two halves 21 are held by clasp 23 in a position in which they surround an adapter 24. Adapter 24 has a circular outside circumference corresponding to the inside circumference of laser carrier 20. Thus, laser carrier 20 can be rotated about adapter 24. One or more features may be provided for fixing the relative positions between laser holder 20 and adapter 24. Notches can be provided in order that predefined intervals of laser 8 from saw 2 can be readily adjusted, or a clamping of the two halves 21 relative to adapter 24 can take place so strongly that an unintended rotation of laser holder 20 about adapter 24 can not take place.

Laser 8 is present in laser holder 20 as well as a connection to battery 26 via cable 25. A switch is not sketched in the present sketch. The switch can either be located on laser holder 20 itself or, as already described in the previous exemplary embodiments, on saw handle 4.

Adapter 24 is connected to handle 4. To this end adapter 24 has a recess corresponding to the cross section of handle 4. Either a screw connection, adhesive connection or some other manner of fixing can be provided for fastening adapter 24 to handle 4. The opening of adapter 24 substantially corresponds to the cross section of handle 4. Various adapters 24 are to be provided as a function of the saw manufacturer or the saw type. In spite of the different recesses for the different handles 4, the outside circumference of adapter 24 is the same in all instances so that it corresponds to laser holder 20 and that the latter can be universally used. Adapter 24 can also be constructed in a divided manner for positioning and removing adapter 24 on handle 4.

The present invention is not limited to the exemplary embodiments shown. Combinations of the individual details of the various exemplary embodiments also fall within the invention. Of course, an adapter can be dispensed with if the saw has already been prepared for use with a laser. The adapter can also be manufactured from a hardenable material that is roughly formed around the handle, is brought into a connection with the laser holder, and is hardened in this position. Such achieves an individual adaptation to any motor saws.

The invention claimed is:

1. A cutting tool having a marking feature, comprising:
   a blade for cutting, said blade defining a tool axis that is aligned along said blade;
   a motor in mechanical communication with said blade and configured for powering said blade;
   a housing configured for holding said motor so that said blade may be positioned, said housing defining a handle on an opposite side of the tool from said blade, said handle configured for holding the tool;
   a laser holder attached to said handle; and
   a laser carried by said laser holder, said laser configured for creating a laser beam at a selected angle from said tool axis, wherein said selected angle is in a range of greater than about 0 degrees and less than about 90 degrees;
   wherein said laser holder is rotatable attached to said housing such that said laser beam may be selectively directed to either side of said tool axis at said selected angle.

2. A cutting tool as in claim 1, wherein said laser is rotatably attached to said laser holder so that said selected angle may be selectively determined.

3. A cutting tool as in claim 1, wherein said laser is rotatably attached to said laser holder so that said selected angle may be selectively determined.

4. A cutting tool as in claim 1, further comprising a rotary knob in mechanical communication with said laser holder and configured for rotating said laser holder so that said selected angle may be adjusted.

5. A cutting tool as in claim 1, wherein said laser holder is attached to said handle and received into a niche defined by said housing.

6. A cutting tool as in claim 1, further comprising a power supply for energizing said laser; and a switch in electrical communication with said power supply and said laser for selectively operating said laser.

7. A cutting tool as in claim 1, wherein said laser holder is releasably attached to said handle.

8. A cutting tool equipped with a marking feature, comprising
   a saw for cutting, said saw defining a tool axis aligned along said saw;
   a motor connected to said saw for providing power to said saw;
   a housing configured for receipt of said saw and said motor such that the tool may be positioned during use, said housing defining a handle that is positioned on the tool on a side opposite from said saw;
   an adapter configured for attachment to said handle, said adapter being rotatable relative to said housing;
   a laser carrier attached to said adapter; and
   a laser attached to said laser carrier, said laser configured upon said carrier so as to provide for the emission of a laser beam at a beam angle from said tool axis that is in the range of greater than about 0 degrees but less than about 90°; and wherein said adapter can be rotated such that said laser can be selectively directed to either side of the cutting tool.

9. A cutting tool as in claim 8, wherein said laser is rotatably attached to said laser carrier so that said selected beam may be selectively determined.

10. A cutting tool as in claim 8, wherein said laser is rotatably attached to said laser carrier so that said beam angle may be selectively determined.

11. A cutting tool as in claim 8, further comprising a rotary knob in mechanical communication with said laser carrier and configured for rotating said laser carrier so that said beam angle may be adjusted.

12. A cutting tool as in claim 8, wherein said laser carrier is attached to said adapter and received into a niche defined by said housing.

13. A cutting tool as in claim 8, further comprising a power supply for energizing said laser; and a switch in electrical communication with said power supply and said laser for selectively operating said laser.

14. A cutting tool as in claim 8, wherein said laser carrier is releasably attached to said adapter.

15. A cutting tool as in claim 8, wherein said adapter is releasably attached to said handle.

16. A cutting tool as in claim 8, wherein said handle defines an end of the tool that is the fartherest away from said saw, and where said laser is positioned proximate to said handle at said end.

17. A cutting tool as in claim 8, wherein said laser is positioned on said housing at a large distance from said motor.

18. A cutting tool as in claim 8, wherein said laser comprises a line laser.

19. A cutting tool as in claim 8, wherein said laser carrier is configured to surround said adapter.

20. A cutting tool as in claim 8, wherein said laser carrier comprises at least two parts that attach to said adapter.

21. A cutting tool as in claim 8, wherein said laser is configured upon the tool so as to protect the laser from shocks or vibrations.

22. A cutting tool as in claim 8, further comprising a power supply for energizing said laser; and a switch in electrical communication with said power supply and said laser for selectively operating said laser, wherein said switch comprises a finger-tip type switch.

* * * * *